US012024921B2

(12) United States Patent
Rufang

(10) Patent No.: US 12,024,921 B2
(45) Date of Patent: Jul. 2, 2024

(54) TOOL-LESS REKEYABLE LOCK CYLINDER

(71) Applicant: ASSA ABLOY Americas Residential Inc., New Haven, CT (US)

(72) Inventor: Chen Rufang, Xiamen (CN)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 241 days.

(21) Appl. No.: 17/729,381

(22) Filed: Apr. 26, 2022

(65) Prior Publication Data

US 2022/0316238 A1 Oct. 6, 2022

Related U.S. Application Data

(63) Continuation of application No. 16/659,778, filed on Oct. 22, 2019, now Pat. No. 11,319,726.

(60) Provisional application No. 62/748,660, filed on Oct. 22, 2018.

(51) Int. Cl.
*E05B 27/00* (2006.01)

(52) U.S. Cl.
CPC ........ *E05B 27/005* (2013.01); *E05B 27/0082* (2013.01)

(58) Field of Classification Search
CPC .... E05B 27/00; E05B 27/005; E05B 27/0082; E05B 27/0046; E05B 29/0026; E05B 29/004; E05B 29/0066
USPC .......... 70/360, 361, 368, 337–343, 382–385, 70/492–496
See application file for complete search history.

(56) References Cited

U.S. PATENT DOCUMENTS

| | | | |
|---|---|---|---|
| 1,565,556 | A | 12/1925 | Fremon |
| 1,610,224 | A | 12/1926 | Dalboni et al. |
| 1,845,867 | A | 2/1932 | Ellingson |
| 1,965,889 | A | 7/1934 | Fitz |
| 2,139,842 | A | 12/1938 | Miller |
| 2,194,469 | A | 3/1940 | Fremon |
| 2,232,017 | A | 2/1941 | Wilder |
| 2,370,862 | A | 3/1943 | Johnstone |
| 2,391,832 | A | 12/1945 | Johnstone |
| 2,895,323 | A | 7/1959 | Kennedy |
| 2,977,786 | A | 4/1961 | Kendrick et al. |
| 3,149,486 | A | 9/1964 | Russell et al. |
| 3,183,692 | A | 5/1965 | Check |
| 3,190,093 | A | 6/1965 | Schlage |
| 3,261,189 | A | 7/1966 | Best |
| 3,293,892 | A | 12/1966 | Falk |
| 3,320,781 | A | 5/1967 | Hill |
| 3,431,757 | A | 3/1969 | Hori |
| 3,589,153 | A | 6/1971 | Hill |
| 3,667,262 | A | 6/1972 | Hill |
| 3,693,384 | A | 9/1972 | Genakis |
| 3,726,116 | A | 4/1973 | Di Motta |

(Continued)

FOREIGN PATENT DOCUMENTS

| | | | |
|---|---|---|---|
| CA | 2333329 | A1 | 12/1999 |
| DE | 19544840 | A1 | 6/1997 |

(Continued)

*Primary Examiner* — Suzanne L Barrett
(74) *Attorney, Agent, or Firm* — Merchant & Gould P.C.

(57) ABSTRACT

A rekeyable lock cylinder with a cylinder body and a plug assembly. The lock cylinder includes a plurality of key followers and a corresponding plurality of racks disposed in the plug assembly. Disengaging the racks from the key followers allows rekeying of the lock cylinder.

20 Claims, 10 Drawing Sheets

(56) References Cited

U.S. PATENT DOCUMENTS

| | | | |
|---|---|---|---|
| 3,728,880 | A | 4/1973 | Falk |
| 3,735,612 | A | 5/1973 | Popovici |
| 3,754,422 | A | 8/1973 | Stackhouse |
| 3,788,111 | A | 1/1974 | Parlier |
| 3,824,818 | A | 7/1974 | Neale |
| 3,910,083 | A | 10/1975 | Burlingame |
| 3,974,671 | A | 8/1976 | Rossetti |
| 3,990,282 | A | 11/1976 | Sorum |
| 3,999,413 | A | 12/1976 | Raymond et al. |
| 4,015,458 | A | 4/1977 | Mercurio |
| 4,031,729 | A | 6/1977 | Gretler |
| 4,069,694 | A | 1/1978 | Raymond et al. |
| 4,094,175 | A | 6/1978 | Pechner |
| 4,142,391 | A | 3/1979 | Paig |
| 4,195,504 | A | 4/1980 | Foshee |
| 4,320,639 | A | 3/1982 | Kleefeldt et al. |
| 4,372,139 | A | 2/1983 | Laake |
| 4,376,382 | A | 3/1983 | Raymond et al. |
| 4,377,940 | A | 3/1983 | Hucknall |
| 4,380,163 | A | 4/1983 | Reder |
| 4,393,673 | A | 7/1983 | Widen |
| 4,404,824 | A | 9/1983 | Hennessy |
| 4,412,437 | A | 11/1983 | Smith |
| 4,440,009 | A | 4/1984 | Smith |
| 4,689,978 | A | 9/1987 | Drummond |
| 4,712,399 | A | 12/1987 | Mattossovich |
| 4,712,401 | A | 12/1987 | Monahan |
| 4,712,402 | A | 12/1987 | Monahan |
| 4,723,427 | A | 2/1988 | Oliver |
| 4,729,231 | A | 3/1988 | Wu |
| 4,732,023 | A | 3/1988 | Shen |
| 4,747,281 | A | 5/1988 | Monahan |
| 4,765,163 | A | 8/1988 | Trull et al. |
| 4,794,772 | A | 1/1989 | Falk et al. |
| 4,836,002 | A | 6/1989 | Monahan |
| 4,850,210 | A | 7/1989 | Adler et al. |
| 4,899,563 | A | 2/1990 | Martin |
| 4,909,053 | A | 3/1990 | Zipf, III et al. |
| 4,912,953 | A | 4/1990 | Wobig |
| 4,942,749 | A | 7/1990 | Rabinow |
| 4,966,021 | A | 10/1990 | Boag |
| 4,996,856 | A | 3/1991 | Lin et al. |
| 5,000,019 | A | 3/1991 | Foster |
| 5,010,753 | A | 4/1991 | Boris, Jr. |
| 5,024,071 | A | 6/1991 | Shafirkin |
| 5,038,589 | A | 8/1991 | Martin |
| 5,044,180 | A | 9/1991 | Lebrecht |
| 5,044,185 | A | 9/1991 | Green |
| 5,050,412 | A | 9/1991 | Errani |
| 5,070,716 | A | 12/1991 | Whorlow |
| 5,076,081 | A | 12/1991 | Boris, Jr. |
| 5,088,305 | A | 2/1992 | Myers |
| 5,121,619 | A | 6/1992 | Martin |
| 5,174,136 | A | 12/1992 | Thwing |
| 5,209,088 | A | 5/1993 | Vaka |
| 5,211,044 | A | 5/1993 | Kim |
| 5,233,850 | A | 8/1993 | Schroeder |
| 5,291,767 | A | 3/1994 | Weindorf, Jr. et al. |
| 5,325,690 | A | 7/1994 | Adler et al. |
| 5,428,978 | A | 7/1995 | Tsukano |
| 5,431,034 | A | 7/1995 | Fann et al. |
| 5,479,801 | A | 1/1996 | Keller |
| 5,507,162 | A | 4/1996 | Chhatwal |
| 5,540,071 | A | 7/1996 | Reikher |
| 5,640,865 | A | 6/1997 | Widen |
| 5,666,835 | A | 9/1997 | Keller |
| 5,704,234 | A | 1/1998 | Resch |
| 5,718,136 | A | 2/1998 | Aldieri |
| 5,752,400 | A | 5/1998 | Kim |
| 5,765,417 | A | 6/1998 | Bolton |
| 5,791,181 | A | 8/1998 | Sperber et al. |
| 5,884,512 | A | 3/1999 | Wayne |
| 5,921,122 | A | 7/1999 | Lin |
| 5,956,986 | A | 9/1999 | Vonlanthen |
| 5,970,760 | A | 10/1999 | Shen |
| 5,979,200 | A | 11/1999 | Cliff |
| 6,029,484 | A | 2/2000 | Jetton |
| 6,047,577 | A | 4/2000 | Klimas |
| 6,079,240 | A | 6/2000 | Shvarts |
| 6,119,495 | A | 9/2000 | Loreti |
| 6,134,928 | A | 10/2000 | Kang |
| 6,142,717 | A | 11/2000 | Staiger |
| 6,295,850 | B1 | 10/2001 | Anderson |
| 6,425,274 | B1 | 7/2002 | Laitala et al. |
| 6,516,643 | B1 | 2/2003 | Olshausen |
| 6,523,378 | B2 | 2/2003 | Kuo |
| 6,523,382 | B1 | 2/2003 | Dimig et al. |
| 6,532,782 | B2 | 3/2003 | Chiu |
| 6,564,601 | B2 | 5/2003 | Hyatt, Jr. |
| 6,860,131 | B2 | 3/2005 | Armstrong et al. |
| 6,862,909 | B2 | 3/2005 | Armstrong et al. |
| 6,871,520 | B2 | 3/2005 | Armstrong et al. |
| 6,951,123 | B2 | 10/2005 | Chong |
| 6,959,569 | B2 | 11/2005 | Strader et al. |
| 6,973,813 | B2 | 12/2005 | Erdely |
| 7,007,528 | B2 | 3/2006 | Chong et al. |
| 7,059,160 | B2 | 6/2006 | Keller |
| 7,114,357 | B2 | 10/2006 | Armstrong et al. |
| 7,117,701 | B2 | 10/2006 | Armstrong et al. |
| 7,213,429 | B2 | 5/2007 | Armstrong et al. |
| 7,234,331 | B2 | 6/2007 | Armstrong et al. |
| 7,308,811 | B2 | 12/2007 | Armstrong et al. |
| 7,322,219 | B2 | 6/2008 | Armstrong et al. |
| 7,428,836 | B2 | 9/2008 | Yang et al. |
| 7,434,431 | B2 | 10/2008 | Armstrong et al. |
| 7,448,239 | B1 | 11/2008 | Huang et al. |
| 7,448,240 | B1 | 11/2008 | Huang et al. |
| 7,526,935 | B2 | 5/2009 | Huang et al. |
| 7,565,825 | B2 | 7/2009 | Wheatland et al. |
| 7,634,931 | B2 | 12/2009 | Segien et al. |
| 7,836,739 | B2 | 11/2010 | Huang et al. |
| 7,874,191 | B2 | 1/2011 | Chiang et al. |
| 7,878,036 | B2 | 2/2011 | Armstrong et al. |
| 7,900,491 | B2 | 3/2011 | Chong |
| 8,033,150 | B2 | 10/2011 | Armstrong et al. |
| 8,099,988 | B1 | 1/2012 | Wheatland |
| 8,291,735 | B1 | 10/2012 | Damikolas |
| 8,347,678 | B2 | 1/2013 | Chong |
| 8,408,080 | B2 | 4/2013 | Damikolas |
| 8,656,747 | B2 | 2/2014 | Armstrong et al. |
| 8,739,587 | B2 * | 6/2014 | Chen .................. E05B 27/0082 70/495 |
| 8,881,567 | B2 | 11/2014 | Chong et al. |
| RE45,627 | E | 7/2015 | Chong et al. |
| 9,127,479 | B2 | 9/2015 | Romero et al. |
| 9,359,791 | B2 | 6/2016 | Zhang |
| 9,657,499 | B2 | 5/2017 | Emory |
| 9,988,828 | B2 | 6/2018 | Emory |
| 10,435,915 | B2 | 10/2019 | Zhang |
| 11,319,726 | B2 * | 5/2022 | Rufang ............... E05B 27/0082 |
| 2003/0037582 | A1 | 2/2003 | Edwards, Jr. et al. |
| 2003/0084692 | A1 | 5/2003 | Herdman |
| 2003/0089149 | A1 | 5/2003 | Suzuki et al. |
| 2003/0154753 | A1 | 8/2003 | Dimig et al. |
| 2004/0069030 | A1 | 4/2004 | Takadama |
| 2005/0132766 | A1 | 6/2005 | Milo |
| 2005/0229656 | A1 | 10/2005 | Brown et al. |
| 2006/0117822 | A1 | 6/2006 | Boesel et al. |
| 2008/0314106 | A1 | 12/2008 | Mathachan |
| 2010/0050717 | A1 | 3/2010 | Chiang et al. |
| 2016/0369527 | A1 | 12/2016 | Farag et al. |
| 2020/0040605 | A1 | 2/2020 | Farag |

FOREIGN PATENT DOCUMENTS

| | | | |
|---|---|---|---|
| EP | 0210037 | A2 | 1/1987 |
| EP | 0526904 | A1 | 5/1996 |
| EP | 0872615 | A2 | 10/1998 |
| GB | 990987 | A | 5/1965 |
| GB | 1554877 | A | 10/1979 |

(56) References Cited

FOREIGN PATENT DOCUMENTS

| | | | |
|---|---|---|---|
| JP | 2001234648 | A | 8/2001 |
| JP | H07197705 | A | 5/2003 |
| WO | 1997036072 | A1 | 10/1997 |

* cited by examiner

TOOL-LESS REKEYABLE LOCK CYLINDER

CROSS-REFERENCE TO RELATED APPLICATION

This application is a continuation of U.S. patent application Ser. No. 16/659,778, filed Oct. 22, 2019, now U.S. Pat. No. 11,319,726, which claims the benefit of U.S. Provisional Application Ser. No. 62/748,660, filed Oct. 22, 2018, which applications are hereby incorporated by reference in their entirety.

TECHNICAL FIELD

This disclosure relates generally to locks; in particular, this disclosure relates to a lock with a rekeyable lock cylinder.

BACKGROUND

Lock cylinders that can be rekeyed without removal of the cylinder plug are known. For example, U.S. Pat. No. 7,900,491 describes a rekeyable lock cylinder. These types of locks are highly beneficial to consumers because the locks can be easily rekeyed without use of a locksmith. A separate tool is used to activate a rekey mode of the lock cylinder, and the tool can become lost or broken. Therefore, there is a need for a rekeyable lock that does not require a separate tool for rekeying of the lock.

SUMMARY

According to one aspect, this disclosure provides a rekeyable lock cylinder with a cylinder body having a longitudinal axis. A plug assembly is disposed in the cylinder body that is rotatable about the longitudinal axis. The plug assembly includes a plug body, a key follower disposed in the plug body, and a rack corresponding to the key follower. The rack is selectively disengageable from the key follower to facilitate rekeying to a new key. A locking bar is movable between a locked position for blocking rotation of the plug assembly with respect to the cylinder body and an unlocked position to allow rotation of the plug assembly with respect to the cylinder body. A plug face of the plug body is spaced apart from the cylinder body to allow longitudinal movement of the plug body relative to the cylinder body. The plug face is configured to provide means for blocking longitudinal movement of the plug body relative to the cylinder body when the rekeyable lock cylinder is in a locked state and for allowing longitudinal movement of the plug body relative to the cylinder body for performing a rekey operation when the rekeyable lock cylinder is in an unlocked state.

According to another aspect, this disclosure provides a rekeyable lock cylinder with a cylinder body having a longitudinal axis and a groove. A plug assembly is disposed in the cylinder body and is rotatable about the longitudinal axis. The plug assembly includes a plug body, a carrier extending alongside the plug body, a key follower disposed in the plug body, and a rack disposed in the carrier and corresponding to the key follower. The carrier is longitudinally movable relative to the plug body between a set position where the rack is engaged with the key follower and a learn position where the rack is disengaged from the key follower to facilitate rekeying to a new key. A locking bar is movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. The rack controls movement of the locking bar between the locked and unlocked positions. A plug face of the plug body is spaced apart from the cylinder body to allow longitudinal movement of the plug body relative to the cylinder body. The carrier moves from the set position to the learn position in response to longitudinal movement of the plug body relative to the cylinder body.

According to another aspect, this disclosure provides a method for rekeying a rekeyable lock cylinder where a cylinder body with a longitudinal axis and a groove is provided. A plug assembly is provided and disposed in the cylinder body. The plug assembly includes a plug body, a carrier extending alongside the plug body, a key follower disposed in the plug body, and a rack disposed in the carrier and corresponding to the key follower. The carrier is longitudinally movable relative to the plug body between a set position where the rack is engaged with the key follower and a learn position where the rack is disengaged from the key follower to facilitate rekeying to a new key. A locking bar is provided and movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. The rack controls movement of the locking bar between the locked and unlocked positions. A valid key is inserted into the plug assembly while the plug assembly is in a home position, and the plug assembly is rotated. A plug face of the plug body is moved toward the cylinder body such that the plug assembly moves longitudinally relative to the cylinder body. The plug face of the plug body is moved away from the cylinder body such that the plug assembly moves longitudinally relative to the cylinder body and the carrier moves from the set position to the learn position. The valid key is removed while the carrier is in the learn position and a replacement key is inserted. The plug assembly is rotated to the home position.

Additional features of the present disclosure will become apparent to those skilled in the art upon consideration of illustrative embodiments including the best mode of carrying out the disclosure as presently perceived.

BRIEF DESCRIPTION OF THE FIGURES

The detailed description makes reference to the accompanying figures in which.

Corresponding reference characters indicate corresponding parts throughout the several views. The exemplification set out herein illustrates an embodiment of the invention in one form, and such exemplification is not to be construed as limiting the scope of the invention in any manner.

DETAILED DESCRIPTION

Figure 1:
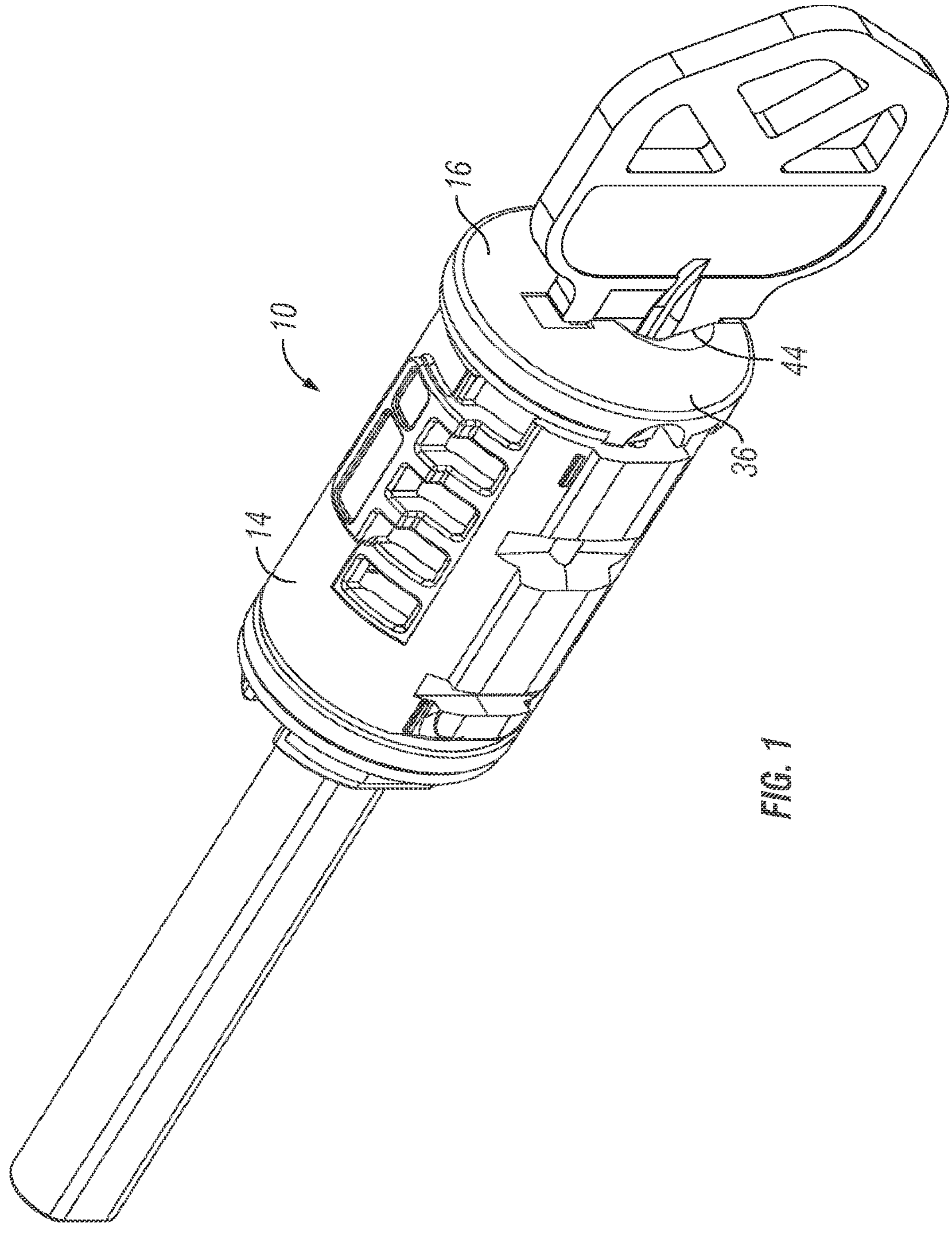
FIG. 1 is an upper perspective view of an example lock cylinder according to an embodiment of this disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

This disclosure relates to a rekeyable lock cylinder that can be rekeyed without removal of the cylinder plug. One example of a rekeyable lock cylinder that can be rekeyed using a separate tool is described in U.S. Pat. No. 7,900,491, which is hereby incorporated by reference. The present lock cylinder can be rekeyed without the use of a separate tool.

Figure 2:
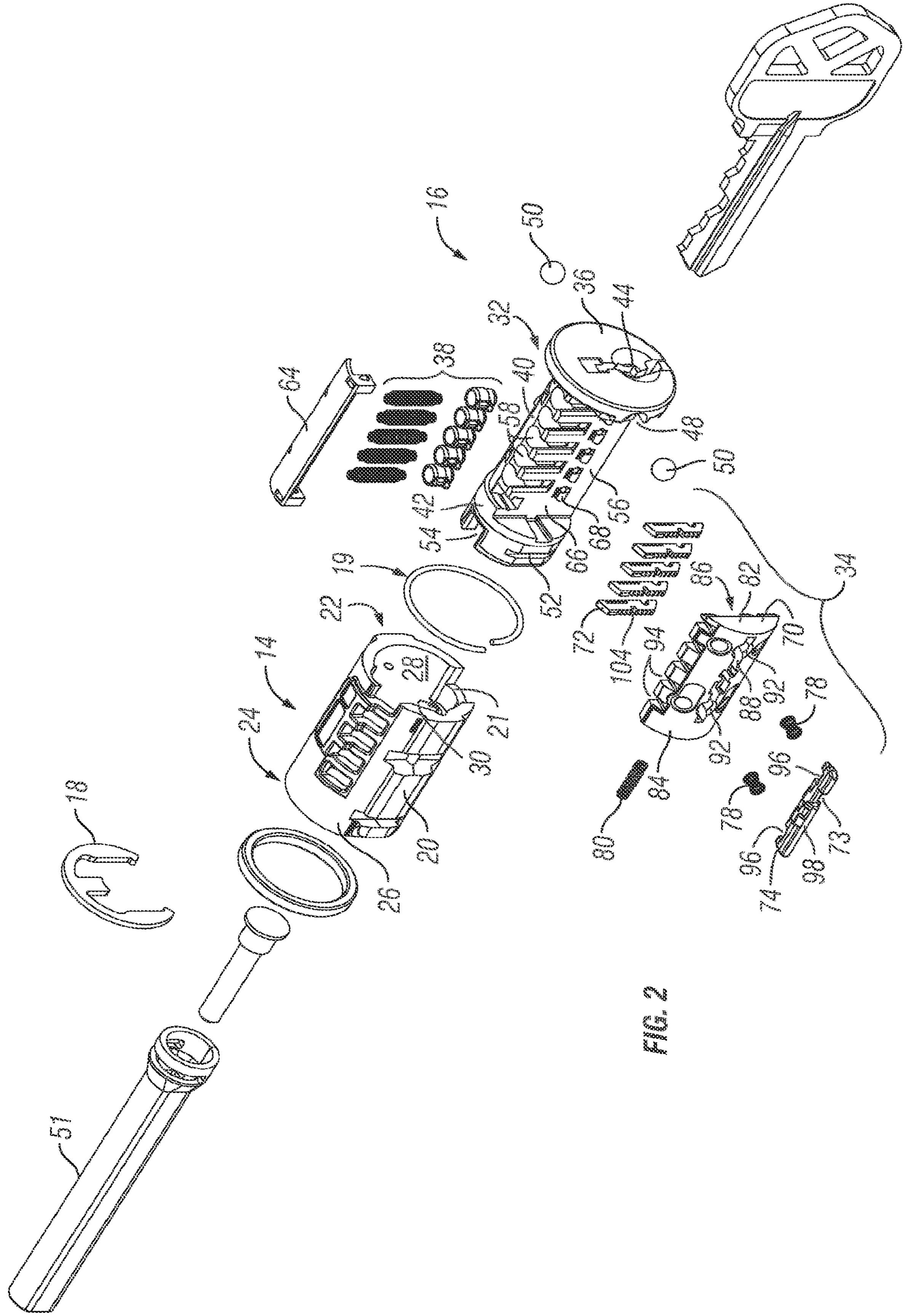
FIG. 2 is an exploded view of the example lock cylinder shown in FIG. 1.

An illustrative lock cylinder 10, according to an embodiment of the present disclosure, is illustrated in FIGS. 1 and 2. The lock cylinder 10 includes a cylinder body 14 and a plug assembly 16. A retainer clip 18 (FIG. 2) couples together the cylinder body 14 with the plug assembly 16.

The cylinder body 14, as best seen in FIG. 2, illustratively includes a generally cylindrical body 20 having a front end 22, a back end 24, and a cylinder wall 26 defining an interior surface 28. The cylinder wall 26 includes an interior, locking bar-engaging groove 30 (best seen in FIGS. 7, 9, 11). In some embodiments, the locking bar-engaging groove 30 has a generally curvilinear cross-section and extends longitudinally along a portion of the cylinder body 14, typically from the front end 22.

The plug assembly 16 includes a plug body 32, a carrier subassembly 34, and a plurality of spring-loaded pins 38 (also called key followers). The plug body 32 illustratively includes a plug face 36, an intermediate portion 40, and a drive portion 42. The plug face 36 defines a keyway opening 44, a channel 48 extending radially outwardly for receiving an anti-drilling ball bearing 50, and a standoff 23 (FIG. 4) which also includes a channel for receiving the anti-drilling ball bearing 50. The drive portion 42 is configured to drive a torque blade 51, which could be coupled with a latch assembly (not shown). The drive portion 42 further includes a pair of slots 52 formed in its perimeter and a central groove 54 for receiving the retainer clip 18 to retain the plug body 32 in the cylinder body 14.

The intermediate portion 40 includes a main portion 56 formed as a cylinder section and having a plurality of channels 58 for receiving the spring-loaded pins 38. The channels 58 illustratively extend transversely to the longitudinal axis of the plug body 32. A retaining cap 64 is coupled to the plug body 32 to trap the spring-loaded pins 38 inside the plug body 32. The channels 58 extend partially through the plug body 32, with the sidewalls of the channels open to a planar surface 66. The planar surface 66 illustratively includes a plurality of bullet-shaped, rack-engaging features 68 that block rekeying of the lock cylinder 10 if racks 72 are not aligned to unlock the lock cylinder 10 (e.g., if a valid key is not inserted into the lock cylinder 10).

The carrier subassembly 34 includes a carrier 70, a plurality of racks 72, a locking bar 74, biasing members 78 to urge the locking bar 74 into the locking bar-engaging groove 30 of the cylinder body 14, and a return spring 80. The carrier 70 includes a body 82 in the form of a cylinder section that is complementary to the main portion 56 of the plug body 32, such that the carrier 70 and the main portion 56 combine to form a cylinder that fits inside the cylinder body 14. The carrier 70 includes a curved surface 84 and a flat surface 86. The curved surface 84 includes a locking bar slot 88 and a pair of biasing member-receiving bores 92 for receiving the biasing members 78. In the embodiment shown, the locking bar 74 includes a corresponding pair of recessed areas 96 for receiving the biasing members 78. The flat surface 86 of the carrier 70 includes a plurality of parallel rack-receiving slots 94 extending perpendicular to the longitudinal axis of the carrier 70.

Figure 7:
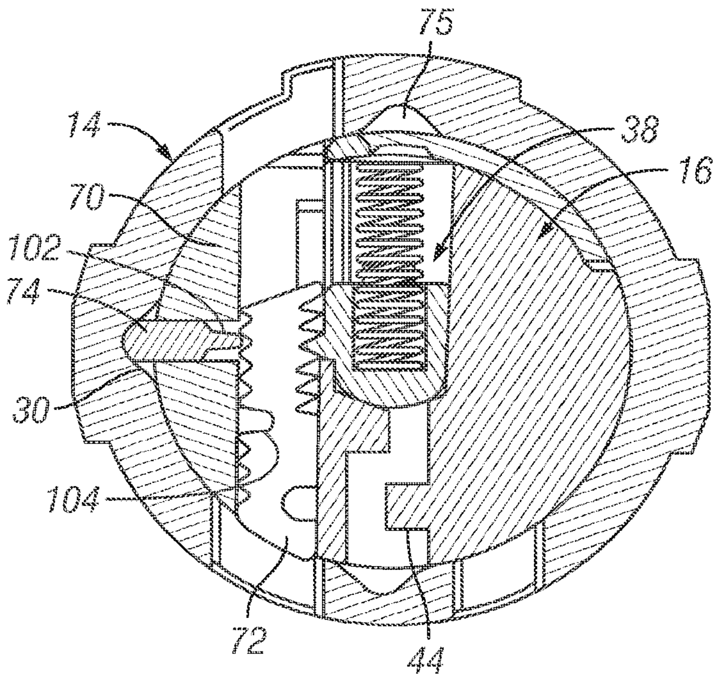
FIG. 7 is a cross-sectional view of the lock cylinder shown in FIG. 6 along line 7-7.
Figure 9:
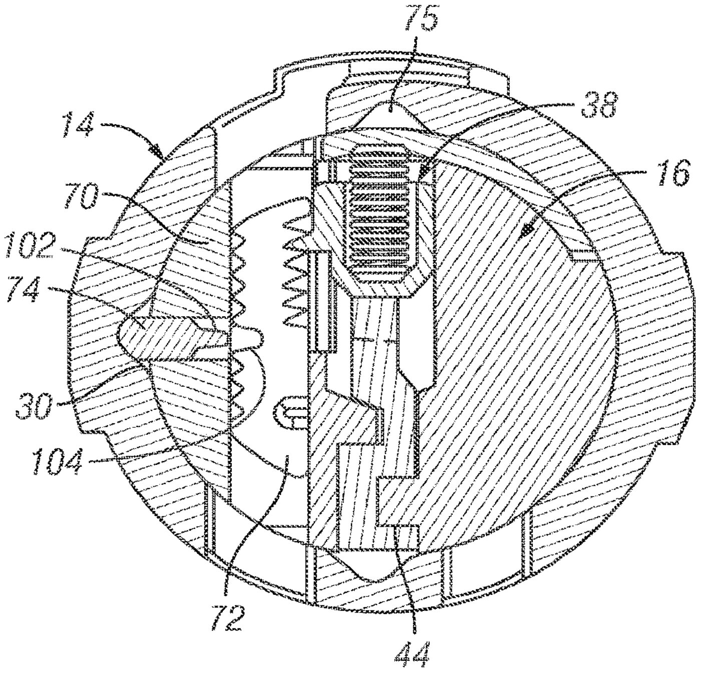
FIG. 9 is a cross-sectional view of the lock cylinder shown in FIG. 8 along line 9-9.
Figure 11:
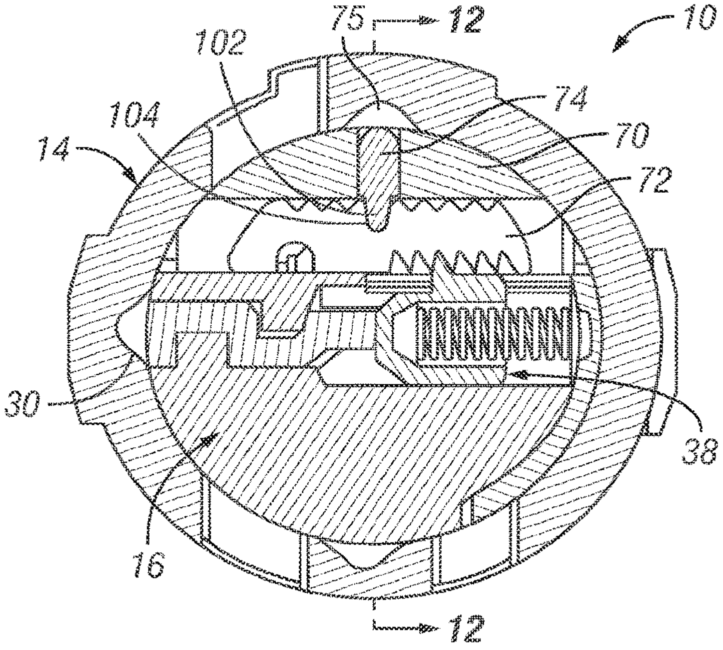
FIG. 11 is a cross-sectional view of the lock cylinder shown in FIG. 10 along line 11-11.
Figure 12:
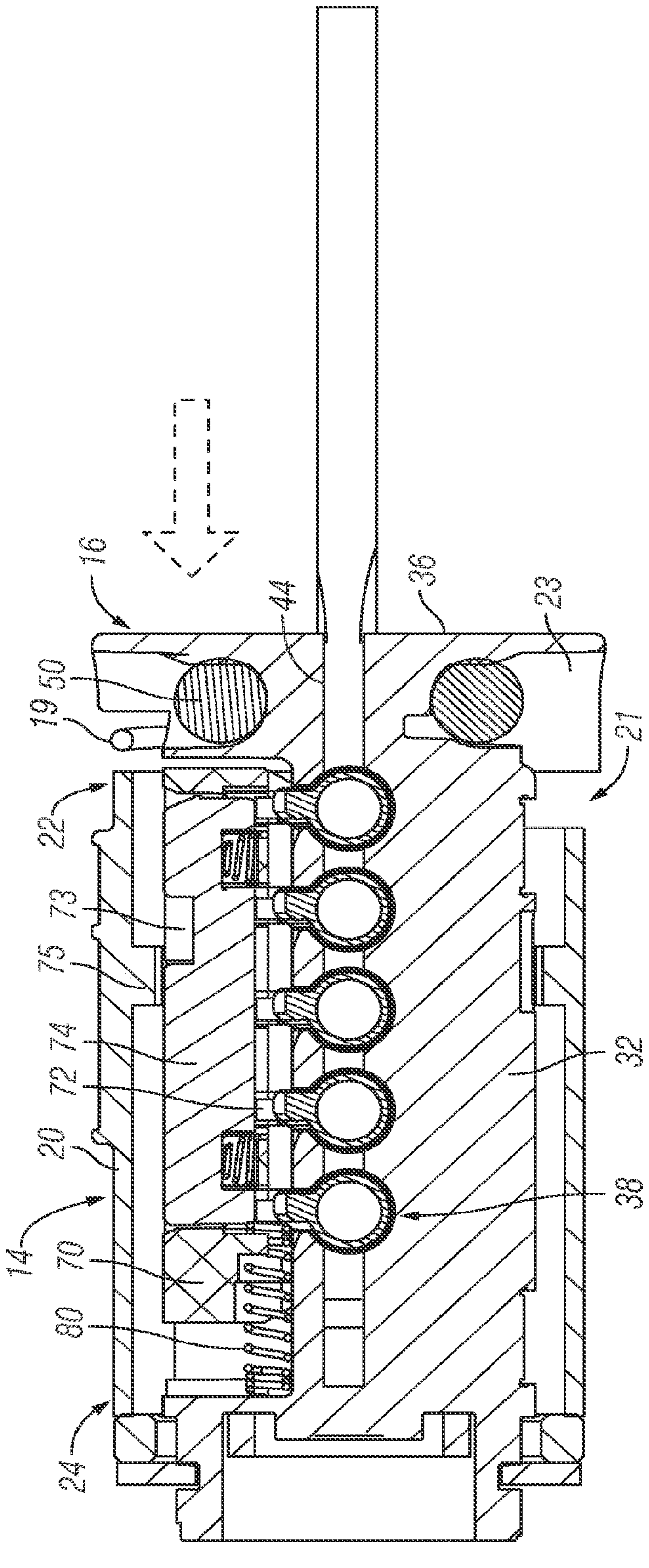
FIGS. 12-14 are cross-sectional views of the lock cylinder of FIG. 11 along line 12-12 illustrating an exemplary rekey operation of the lock cylinder where the plug body moves relative to the cylinder body to disengage the key followers from the racks.
Figure 13:
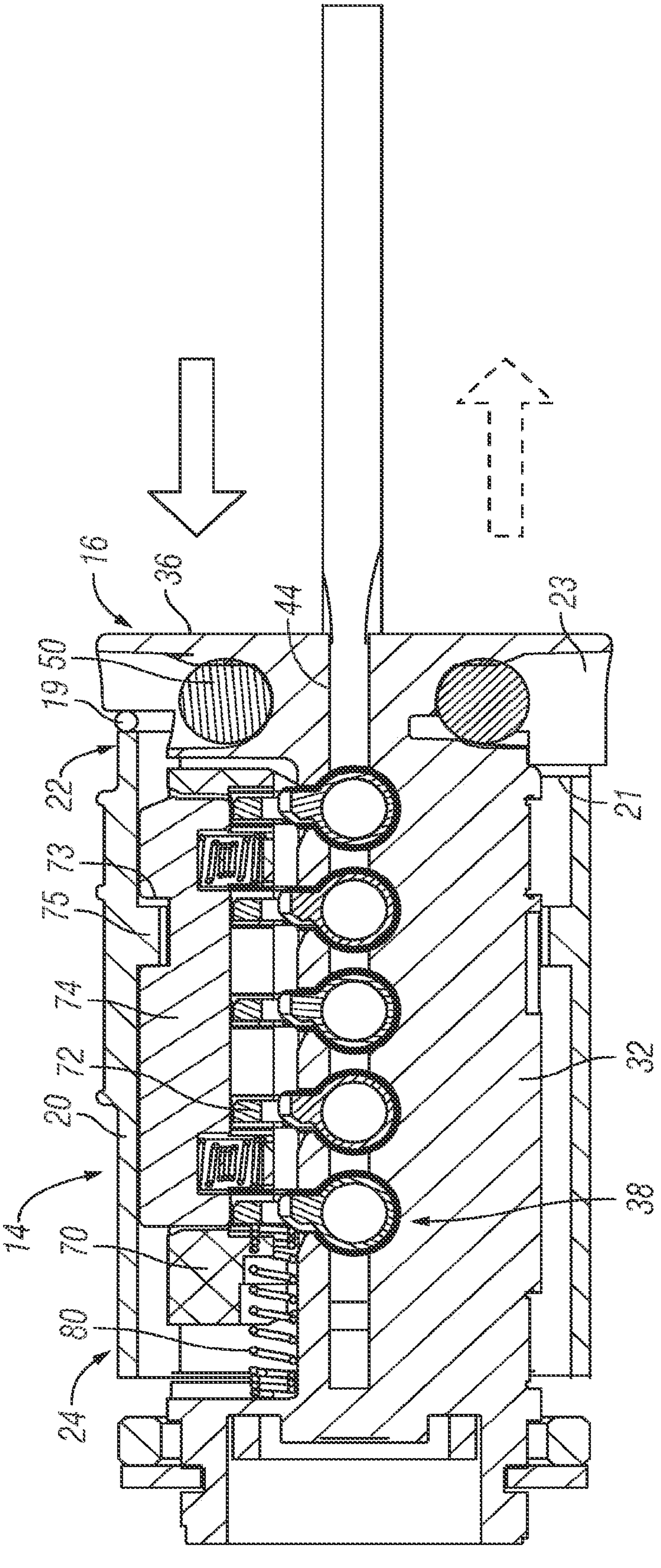
Figure 14:
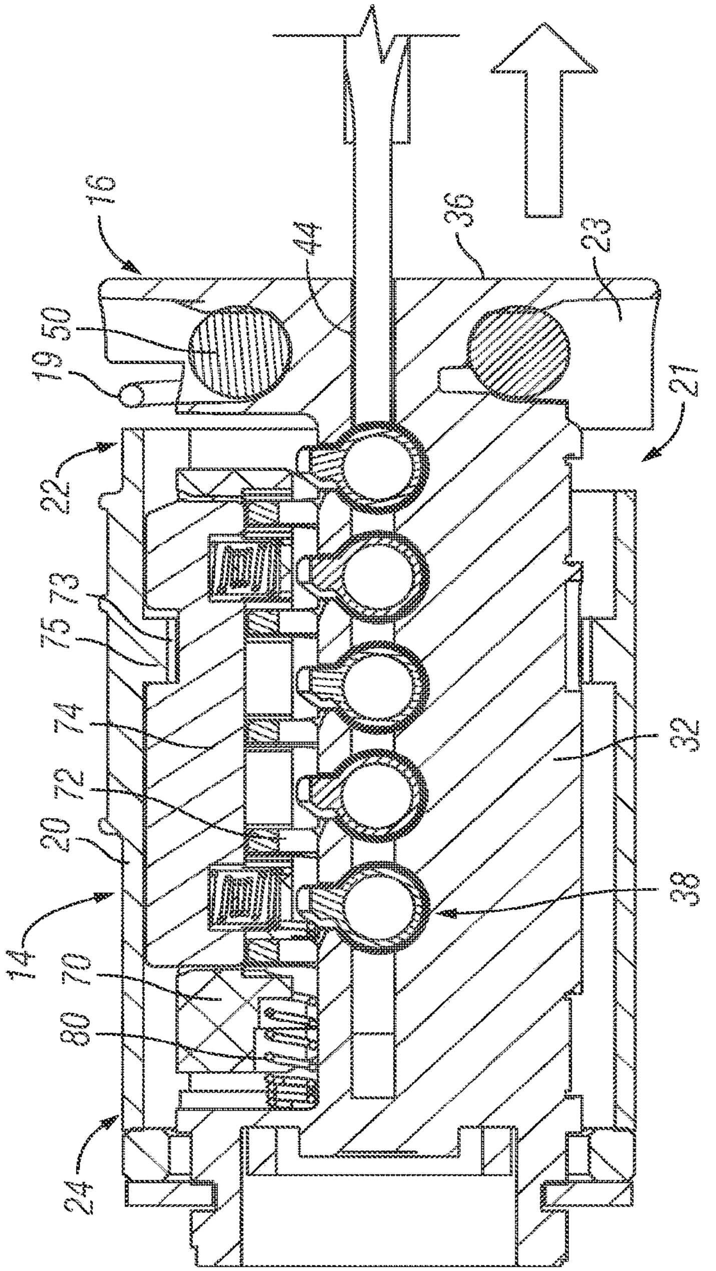

The spring-loaded locking bar 74 is sized and configured to fit in the locking bar slot 88 in the carrier 70. The locking bar 74 illustratively includes a blocking portion 98 that is received in the locking bar-engaging groove 30 in the cylinder body 14 when in the locked position and extends out of the locking bar-engaging groove 30 when in an unlocked position (FIGS. 7, 9, 11). The blocking portion 98 is formed to define a notch 73 that engages with a catch 75 of the lock cylinder 14 during a rekey operation (FIGS. 12, 13, 14). Opposite the blocking portion 98, the locking bar 74 includes a flange 102 configured to engage locking bar-engaging grooves 104 formed in the racks 72 (FIG. 11). Rotation of the plug assembly 16 forces the locking bar 74 out of the locking bar-engaging groove 30 when the racks are in an unlocked position (FIG. 9).

Figure 3:
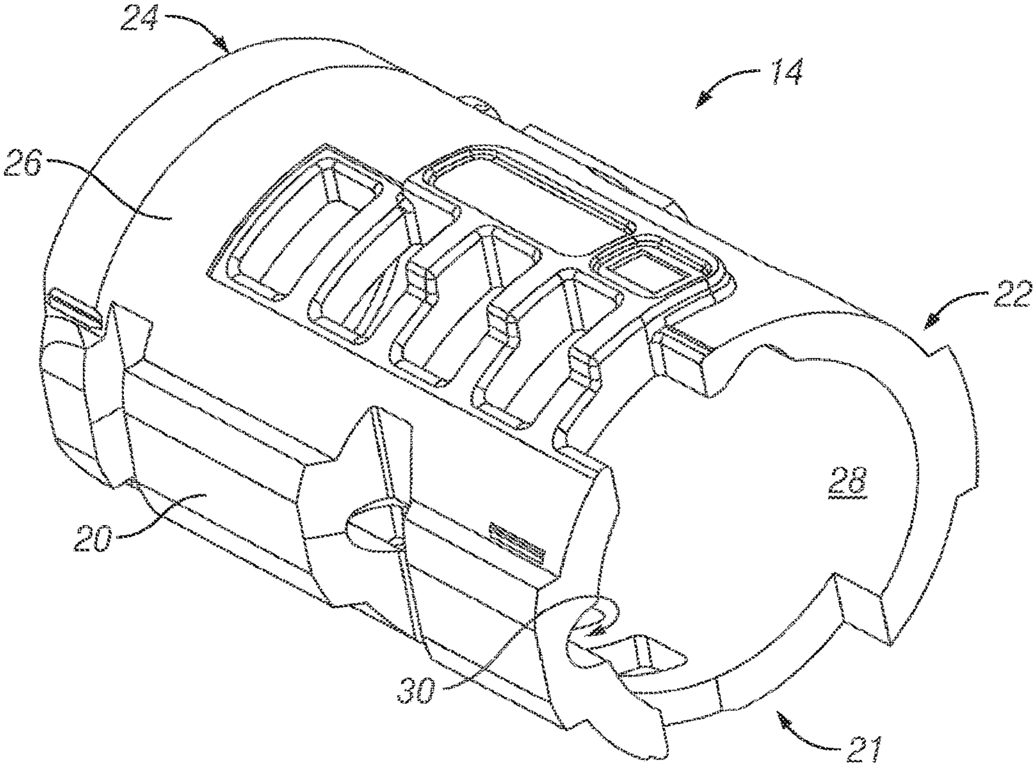
FIG. 3 is a perspective view of an example of a cylinder body according to an embodiment of this disclosure.
Figure 4:
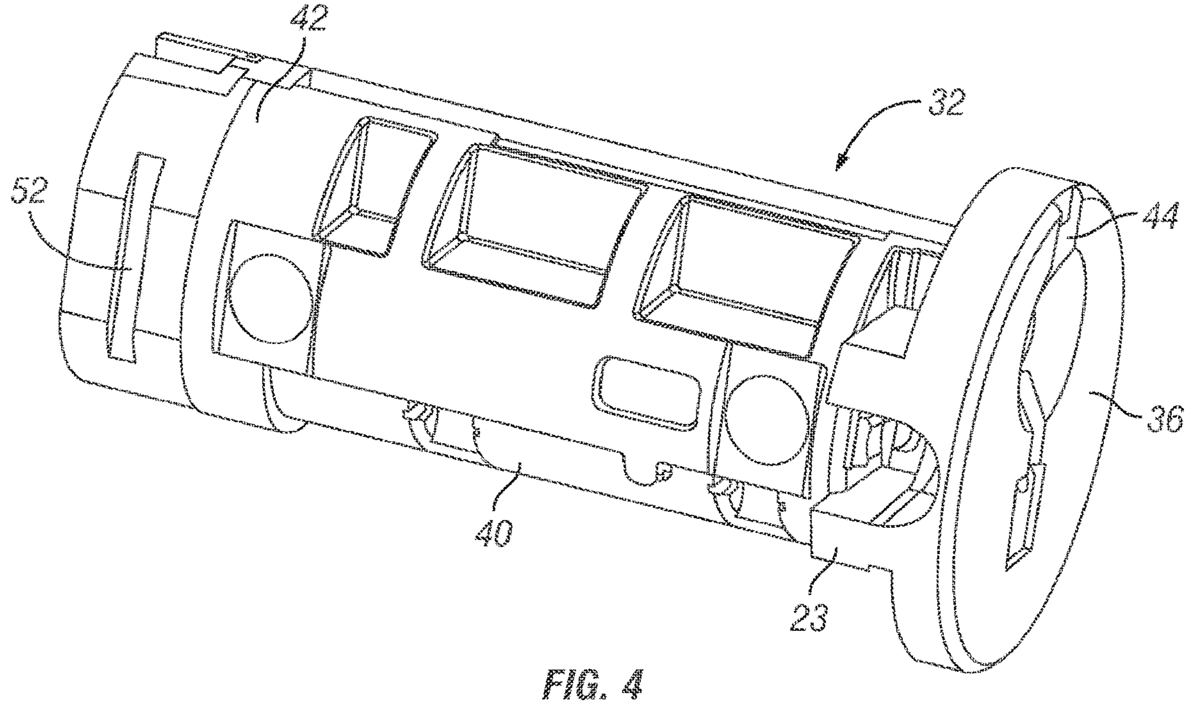
FIG. 4 is a perspective view of an example of a plug body according to an embodiment of this disclosure.
Figure 5:
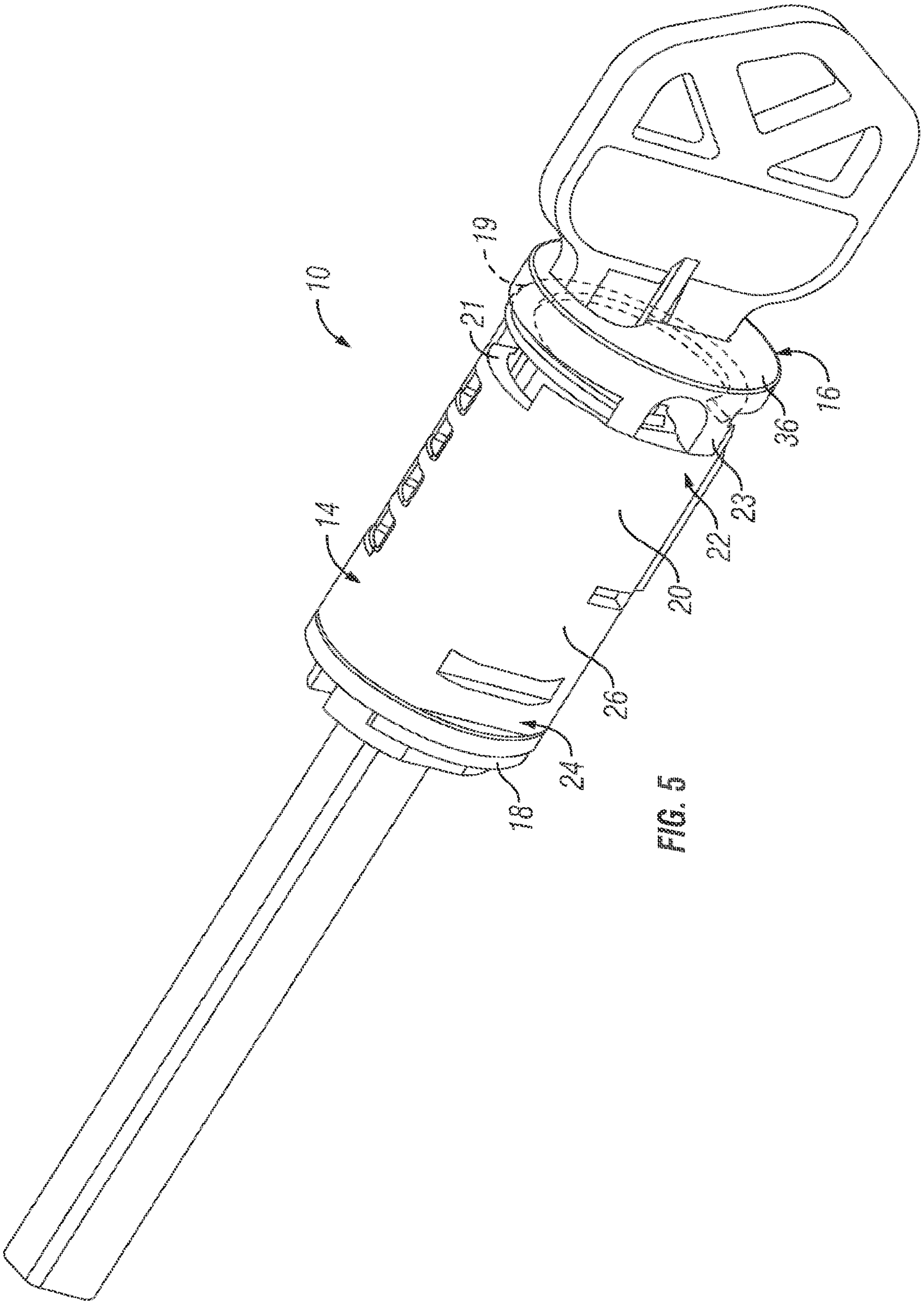
FIG. 5 is a lower perspective view the lock cylinder of FIG. 1.
Figure 6:
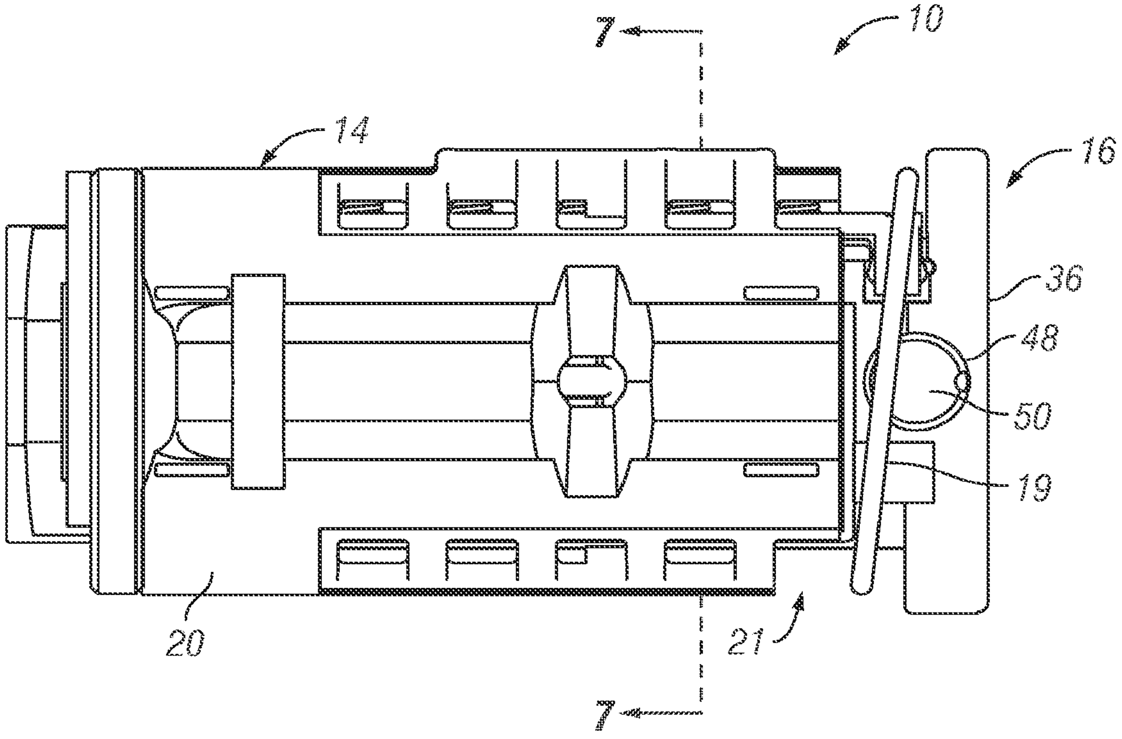
FIG. 6 is a side elevational view of the lock cylinder of FIG. 1 in a locked position.

The cylinder body 14 is formed to include a recess 21 extending into the front end 22 of body 20 toward the back end 24 as shown in FIG. 3. The recess 21 is sized to receive the standoff 23 of plug body 32 (FIG. 4). In a locked position of lock cylinder 10, for example shown in FIG. 5, the standoff 23 engages with the front end 22 of the cylinder body 14 to block longitudinal movement of the plug assembly 16 relative to the cylinder body 14. Insertion of a valid key and rotation of the plug assembly 16 aligns the standoff 23 with the recess 21 to allow longitudinal movement of the plug assembly 16 relative to the cylinder body 14. In some embodiments, the cylinder body 14 is formed to include two recesses 21 on opposing sides of the front end 22. A spring 19, such as a spring washer, biases the plug face 36 away from the front end 22 of the cylinder body 14 (FIGS. 12, 14). In some embodiments, a wave spring washer or coil spring (s) are used in place of the spring washer 19.

Figure 10:
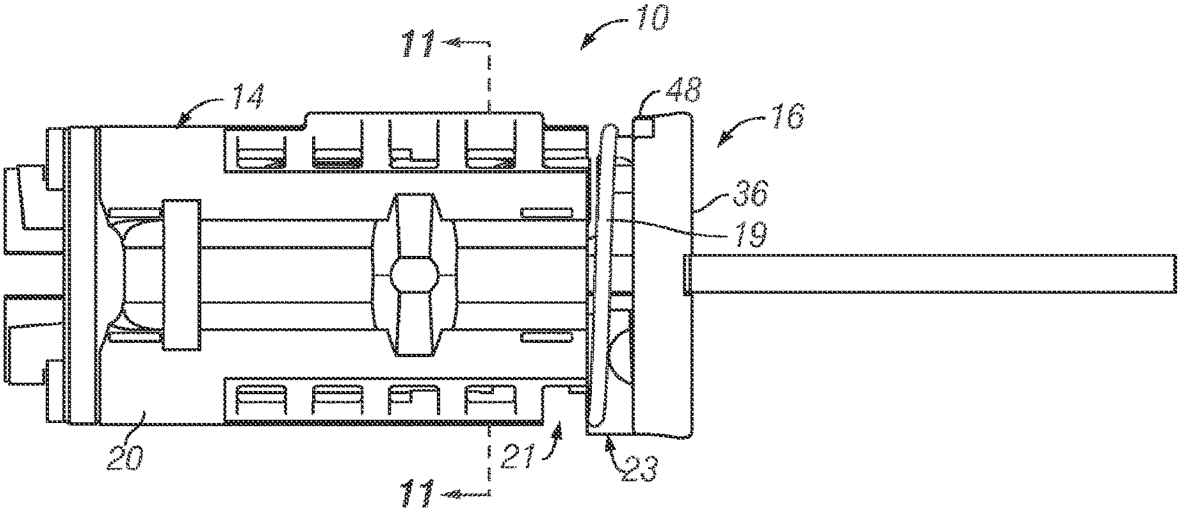
FIG. 10 is a view similar to FIG. 8 showing the key rotated to unlock the lock cylinder.

To rekey the lock cylinder 10, a first (valid) key is inserted into the keyway opening 44 to align the flange 102 of the locking bar 74 with the locking bar-engaging grooves 104 of racks 72 as suggested in FIGS. 6, 7, 8, and 9. The first key is rotated, along with the plug assembly 16, such as, for example, clockwise from the position shown in FIGS. 8 and 9 to the position shown in FIGS. 10 and 11. Rotation of the plug assembly 16 forces the locking bar 74 out of the locking bar-engaging groove 30 and aligns the standoff 23 of the plug body 32 with the recess 21 of the cylinder body 14 (FIG. 10). When the standoff 23 is aligned with the recess 21, the locking bar 74 is aligned with the catch 75 (FIG. 11).

During regular operation of the lock cylinder 10, the carrier 70 is in a set position where the racks 72 are engaged with the spring-loaded pins 38, and the notch 73 of the locking bar 74 is offset from the catch 75 when the plug assembly 16 is rotated with the first key as suggested in FIG. 12. Alignment of the standoff 23 with the recess 21 allows the plug assembly 16 to be pushed into the cylinder body 14 and align the notch 73 with the catch 75. The locking bar 74 moves radially outward to engage with the catch 75 as suggested in FIG. 13. Removing the first key moves the plug body 32 back out of the cylinder body 14 while the carrier 70 remains in place due to the locking bar 74 being engaged with the catch 75 as suggested in FIG. 14. The carrier 70 moves relative to the plug body 32 from the set position to a learn position where the spring-loaded pins 38 are disengaged from the racks 72 to allow rekeying of the lock cylinder 10 as suggested in FIG. 14.

Figure 8:
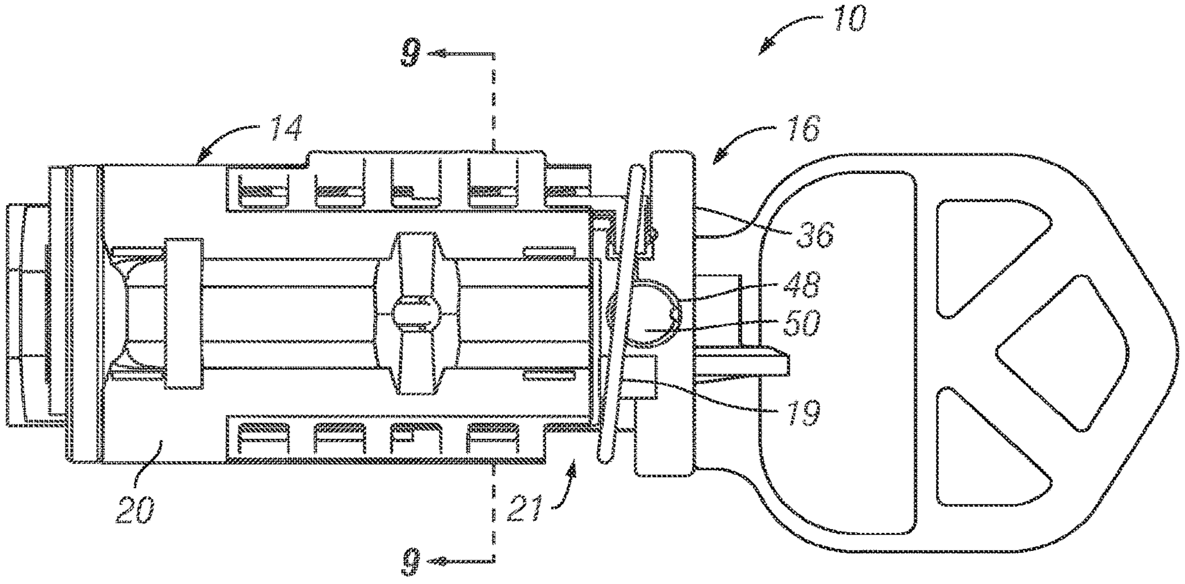
FIG. 8 is a view similar to FIG. 6 showing a key inserted into the lock cylinder.

A second key is inserted and rotated, such as counter-clockwise from the position shown in FIGS. 10 and 11 to the position shown in FIGS. 8 and 9 for example, to force the locking bar 74 radially inward and release the notch 73 from the catch 75. The carrier 70 is biased toward the plug face 36 by the return spring 80, causing the racks to re-engage the spring-loaded pins 38. At this point, the lock cylinder 10 is keyed to the second (valid) key and the first key no longer operates the lock cylinder 10. The rekeying operation is completed without use of a separate tool.

EXAMPLES

Illustrative examples of the faucet disclosed herein are provided below. An embodiment of the faucet may include any one or more, and any combination of, the examples described below.

Example 1 is a rekeyable lock cylinder with a cylinder body having a longitudinal axis. A plug assembly is disposed in the cylinder body that is rotatable about the longitudinal axis. The plug assembly includes a plug body, a key follower disposed in the plug body, and a rack corresponding to the key follower. The rack is selectively disengageable from the key follower to facilitate rekeying to a new key. A locking bar is movable between a locked position for blocking rotation of the plug assembly with respect to the cylinder body and an unlocked position to allow rotation of the plug assembly with respect to the cylinder body. A plug face of the plug body is spaced apart from the cylinder body to allow longitudinal movement of the plug body relative to the cylinder body. The plug face is configured to provide means for blocking longitudinal movement of the plug body relative to the cylinder body when the rekeyable lock cylinder is in a locked state and for allowing longitudinal movement of the plug body relative to the cylinder body for performing a rekey operation when the rekeyable lock cylinder is in an unlocked state.

In Example 2, the subject matter of Example 1 is further configured such that the plug face is formed to define a standoff extending from the plug face toward the cylinder body. The standoff is engaged with a front end of the cylinder body to block longitudinal movement of the plug body relative to the cylinder body when the rekeyable lock cylinder is in the locked state. The cylinder body is formed to include a recess in the front end configured to receive the standoff and allow longitudinal movement of the plug body relative to the cylinder body when the rekeyable lock cylinder is in the unlocked state.

In Example 3, the subject matter of Example 1 is further configured such that the rekeyable lock cylinder further includes a spring configured to engage with the cylinder body and plug face to bias the plug face away from the cylinder body.

In Example 4, the subject matter of Example 3 is further configured such that the spring is one of a spring washer, wave spring washer, or coil spring.

In Example 5, the subject matter of Example 1 is further configured such that the locking bar is formed to define a notch and the cylinder body is formed to define a catch. The longitudinal movement of the plug body relative to the cylinder body engages the notch with the catch to block longitudinal movement of the rack relative to the cylinder body.

Example 6 is a rekeyable lock cylinder with a cylinder body having a longitudinal axis and a groove. A plug assembly is disposed in the cylinder body and is rotatable about the longitudinal axis. The plug assembly includes a plug body, a carrier extending alongside the plug body, a key follower disposed in the plug body, and a rack disposed in the carrier and corresponding to the key follower. The carrier is longitudinally movable relative to the plug body between a set position where the rack is engaged with the key follower and a learn position where the rack is disengaged from the key follower to facilitate rekeying to a new key. A locking bar is movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. The rack controls movement of the locking bar between the locked and unlocked positions. A plug face of the plug body is spaced apart from the cylinder body to allow longitudinal movement of the plug body relative to the cylinder body. The carrier moves from the set position to the learn position in response to longitudinal movement of the plug body relative to the cylinder body.

In Example 7, the subject matter of Example 6 is further configured such that the plug face is formed to define a standoff extending from the plug face toward the cylinder body. The cylinder body is formed to include a recess. The standoff is rotationally offset from the recess when the lock cylinder is in a locked state to block longitudinal movement of the plug body relative to the cylinder body. The standoff is rotationally aligned with the recess when the lock cylinder is in an unlocked state to allow the standoff to be received in the recess and allow longitudinal movement of the plug body relative to the cylinder body.

In Example 8, the subject matter of Example 7 is further configured such that the rekeyable lock cylinder further includes a spring configured to engage with the cylinder body and plug face to bias the plug face away from the cylinder body.

In Example 9, the subject matter of Example 8 is further configured such that the spring is one of a spring washer, wave spring washer, or coil spring.

In Example 10, the subject matter of Example 6 is further configured such that the locking bar is formed to define a notch and the cylinder body is formed to define a catch. Longitudinal movement of the plug body relative to the cylinder body engages the notch with the catch to block longitudinal movement of the carrier relative to the cylinder body.

Example 11 is a method for rekeying a rekeyable lock cylinder where a cylinder body with a longitudinal axis and a groove is provided. A plug assembly is provided and disposed in the cylinder body. The plug assembly includes a plug body, a carrier extending alongside the plug body, a key follower disposed in the plug body, and a rack disposed in the carrier and corresponding to the key follower. The carrier is longitudinally movable relative to the plug body between a set position where the rack is engaged with the key follower and a learn position where the rack is disengaged from the key follower to facilitate rekeying to a new key. A locking bar is provided and movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. The rack controls movement of the locking bar between the locked and unlocked positions. A valid key is inserted into the plug assembly while the plug assembly is in a home position, and the plug assembly is rotated. A plug face of the plug body is moved toward the cylinder body such that the plug assembly moves longitudinally relative to the cylinder body. The plug face of the plug body is moved away from the cylinder body such that the plug assembly moves longitudinally relative to the cylinder body and the carrier moves from the set position to the learn position. The valid key is removed while the carrier is in the learn position and a replacement key is inserted. The plug assembly is rotated to the home position.

In Example 12, the subject matter of Example 11 is further configured such that the plug face is spaced apart from the cylinder body. The plug face is formed to define a standoff extending from the plug face toward the cylinder body. The cylinder body is formed to include a recess. The standoff is rotationally offset from the recess when the lock cylinder is in a locked state to block longitudinal movement of the plug body relative to the cylinder body. The standoff is rotationally aligned with the recess when the lock cylinder is in an unlocked state to allow the standoff to be received in the recess and allow longitudinal movement of the plug body relative to the cylinder body.

In Example 13, the subject matter of Example 11 is further configured such that a spring is configured to engage with the cylinder body and plug face to bias the plug face away from the cylinder body.

In Example 14, the subject matter of Example 13 is further configured such that the spring is one of a spring washer, wave spring washer, or coil spring.

In Example 15, the subject matter of Example 11 is further configured such that the locking bar is formed to define a notch and the cylinder body is formed to define a catch. Longitudinal movement of the plug body relative to the cylinder body engages the notch with the catch to block longitudinal movement of the carrier relative to the cylinder body.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

The invention claimed is:

1. A rekeyable lock cylinder comprising:

a cylinder body having a front end and defining a longitudinal axis, wherein at least one recess is defined in the front end of the cylinder body and extending towards a back end; and a plug assembly disposed at least partially within the cylinder body and selectively rotatable around the longitudinal axis, the plug assembly including:

- a plug body having a plug face with at least one standoff;
- at least one key follower disposed at least partially within the plug body;
- a carrier positioned alongside of the plug body;
- at least one rack corresponding to the key follower and disposed at least partially within the carrier, wherein the at least one rack is selectively disengageable from the at least one key follower to facilitate keying; and
- a locking bar carried by the carrier, wherein the locking bar is configured to move between at least a locked position and an unlocked position relative to the cylinder body and determining rotatability of the plug assembly, wherein upon insertion of a valid key, the locking bar moves towards the unlocked position such that rotation of the plug assembly aligns the at least one standoff with the at least one recess and allows longitudinal movement of the plug assembly relative to the cylinder body for performing a rekey operation.

2. The rekeyable lock cylinder of claim 1, wherein the at least one recess is a single recess and the at least one standoff is a single standoff.

3. The rekeyable lock cylinder of claim 1, wherein the plug face is biased relative to the front end of the cylinder body along the longitudinal axis via a biasing member.

4. The rekeyable lock cylinder of claim 3, wherein the biasing member includes a spring washer, a wave spring washer, or a coil spring.

5. The rekeyable lock cylinder of claim 1, wherein during the rekey operation, the plug body longitudinally moves relative to the carrier to disengage the at least one key follower from the at least one rack.

6. The rekeyable lock cylinder of claim 1, wherein longitudinal movement of the plug assembly is performed without the use of a separate tool other than the valid key.

7. The rekeyable lock cylinder of claim 1, wherein only a keyway opening is defined in the plug face.

8. The rekeyable lock cylinder of claim 1, wherein the plug face includes at least one anti-drilling ball bearing.

9. The rekeyable lock cylinder of claim 1, wherein the plug body further includes at least one rack-engaging feature that blocks the rekey operation if the valid key is not used.

10. The rekeyable lock cylinder of claim 1, wherein the locking bar is biased in a radially outward direction relative to the longitudinal axis.

11. A rekeyable lock cylinder comprising:

a cylinder body defining a longitudinal axis; and a plug assembly disposed at least partially within the cylinder body and selectively rotatable around the longitudinal axis, and also selectively movable along the longitudinal axis, the plug assembly including:

a plug body;

at least one key follower disposed at least partially within the plug body;

a carrier positioned alongside of the plug body;

at least one rack corresponding to the key follower and disposed at least partially within the carrier; and a locking bar carried by the carrier, wherein a position of the at least one rack via engagement of the at least one key follower controls movement of the locking bar relative to the cylinder body so as to block and allow rotation of the plug assembly, and wherein upon rotation of the plug assembly, the plug body is spaced apart from the cylinder body so as to allow longitudinal movement of the plug body for performing a rekey operation.

12. The rekeyable lock cylinder of claim 11, wherein the cylinder body includes a catch for the locking bar, and wherein upon longitudinal movement of the plug body towards the cylinder body, the locking bar engages with the catch.

13. The rekeyable lock cylinder of claim 12, wherein upon longitudinal movement of the plug body away from the cylinder body, the carrier moves between a set position and a learn position.

14. The rekeyable lock cylinder of claim 13, wherein the carrier is spring biased.

15. The rekeyable lock cylinder of claim 11, further comprising a biasing member disposed between a front face of the cylinder body and a plug face of the plug body.

16. A method for rekeying a rekeyable lock cylinder comprising:

inserting a first key into a keyway opening of a plug body of a plug assembly, the first key being a valid key, wherein the first key positions at least one key follower and corresponding at least one rack within the plug assembly so as to allow a locking bar to move towards an unlocked position;

once the locking bar is in the unlocked position, rotating the plug assembly relative to a cylinder body;

pushing the plug assembly at least partially into a front end of the cylinder body;

removing the first key from the plug assembly so as to disengage the at least one rack from that at least one key follower;

inserting a second key into the keyway opening; and rotating the plug assembly via the second key causing the at least one rack to engage the at least one key follower such that the second key is rekeyed to the valid key.

17. The method of claim 16, wherein pushing the plug assembly is performed without a rekeying tool.

18. The method of claim 16, wherein removing the first key from the plug assembly moves the plug body back out of the cylinder body so as to set a carrier to a learn position.

19. The method of claim 16, wherein pushing the plug assembly at least partially into the front end of the cylinder body aligns the locking bar with a catch defined in the cylinder body.

20. The method of claim 19, wherein rotating the plug assembly via the second key cams the locking bar out of the catch.

* * * * *